United States Patent
Theobald, Jr. et al.

(10) Patent No.: US 6,424,481 B1
(45) Date of Patent: Jul. 23, 2002

(54) FIVE AND ONE-QUARTER INCH FORM FACTOR COMBINATION DAT TAPE DRIVE AND CASSETTE MAGAZINE LOADER

(75) Inventors: William L. Theobald, Jr., Newport Beach; Kenneth C. Campbell, Orange, both of CA (US); Roger M. Gray, Lewisville, TX (US); Lyle J. Hedlund, Irving, TX (US); Raymond D. Heistand, II, Flower Mound, TX (US); Barry C. Kockler, Lewisville, TX (US); Thomas Noonan, Plano, TX (US); Warren K. Shannon, Highland Village, TX (US); Haruhi Nakagawa, Ehime-ken; Bunroku Ochi, Matsuyama, both of (JP)

(73) Assignee: Seagate Technologies, Inc., Scotts Valley, CA (US)

( * ) Notice: Subject to any disclaimer, the term of this patent is extended or adjusted under 35 U.S.C. 154(b) by 0 days.

(21) Appl. No.: 08/775,620

(22) Filed: Jan. 2, 1997

Related U.S. Application Data

(63) Continuation of application No. 08/381,744, filed on Feb. 1, 1995, now abandoned, which is a continuation of application No. 07/873,443, filed on Apr. 24, 1992, now Pat. No. 5,402,285, which is a continuation-in-part of application No. 07/769,036, filed on Sep. 30, 1991, now Pat. No. 5,264,974.

(51) Int. Cl.[7] .............................................. G11B 17/00
(52) U.S. Cl. ........................................... 360/69; 360/92
(58) Field of Search ............................ 360/69, 71, 92, 360/96.5

(56) References Cited

U.S. PATENT DOCUMENTS

| | | | |
|---|---|---|---|
| 4,021,855 A | 5/1977 | Czonka et al. | 360/69 |
| 4,225,928 A | 9/1980 | Ohkubo | 364/474 |
| 4,622,610 A | 11/1986 | Makigawa | 360/92 |
| 4,807,066 A | 2/1989 | Imazaike | 360/92 |
| 4,835,634 A | 5/1989 | Ostwald | 360/92 |
| 4,907,889 A | * 3/1990 | Simone | 360/92 |
| 4,989,191 A | * 1/1991 | Kuo | 369/33 |
| 5,036,503 A | 7/1991 | Tomita | 360/36 |
| 5,041,929 A | * 8/1991 | Fryberger et al. | 360/92 |
| 5,050,020 A | * 9/1991 | Campbell et al. | 360/92 |
| 5,089,920 A | 2/1992 | Bryer et al. | 360/92 |
| 5,264,974 A | * 11/1993 | Campbell et al. | 360/92 |
| 5,402,285 A | * 3/1995 | Theobald, Jr. et al. | 360/69 |
| 5,469,310 A | 11/1995 | Slocum et al. | 360/92 |

FOREIGN PATENT DOCUMENTS

| | | | |
|---|---|---|---|
| DE | 3904726 A | 8/1989 | |
| DE | 3904911 A | 8/1989 | |
| EP | 0 284 445 | 9/1988 | |
| EP | 0 293 047 | 11/1988 | |
| EP | 0310427 | 4/1989 | G11B/15/68 |
| EP | 0392620 | 10/1990 | G11B/15/68 |
| EP | 0535640 | 4/1993 | G11B/15/68 |
| FR | 2279195 | 2/1976 | |
| FR | 2366661 | 2/1976 | |
| GB | 2218254 | 11/1989 | |

* cited by examiner

*Primary Examiner*—Andrew L. Sniezek
(74) *Attorney, Agent, or Firm*—Fliesler Dubb Meyer & Lovejoy LLP

(57) ABSTRACT

A generally rectangular outer housing is sized to fit within the full height five and one quarter inch form factor. A drawer is mounted for sliding motion within the housing along a longitudinal axis thereof from a retracted position in which the drawer is substantially fully contained within the housing to an extended position in which a forward portion of the drawer extends beyond a forward transverse end of the housing. A DAT tape drive is mounted within a rear portion of the drawer and has a forwardly opening cassette insertion slot. A cassette magazine is provided that has a plurality of vertically spaced receptacles for holding a plurality of DAT cassettes in a vertically stacked configuration. A magazine loader is mounted in the forward portion of the drawer for receiving and vertically reciprocating the cassette magazine and for selectively transferring cassettes between the magazine and the cassette insertion slot of the DAT tape drive.

9 Claims, 12 Drawing Sheets

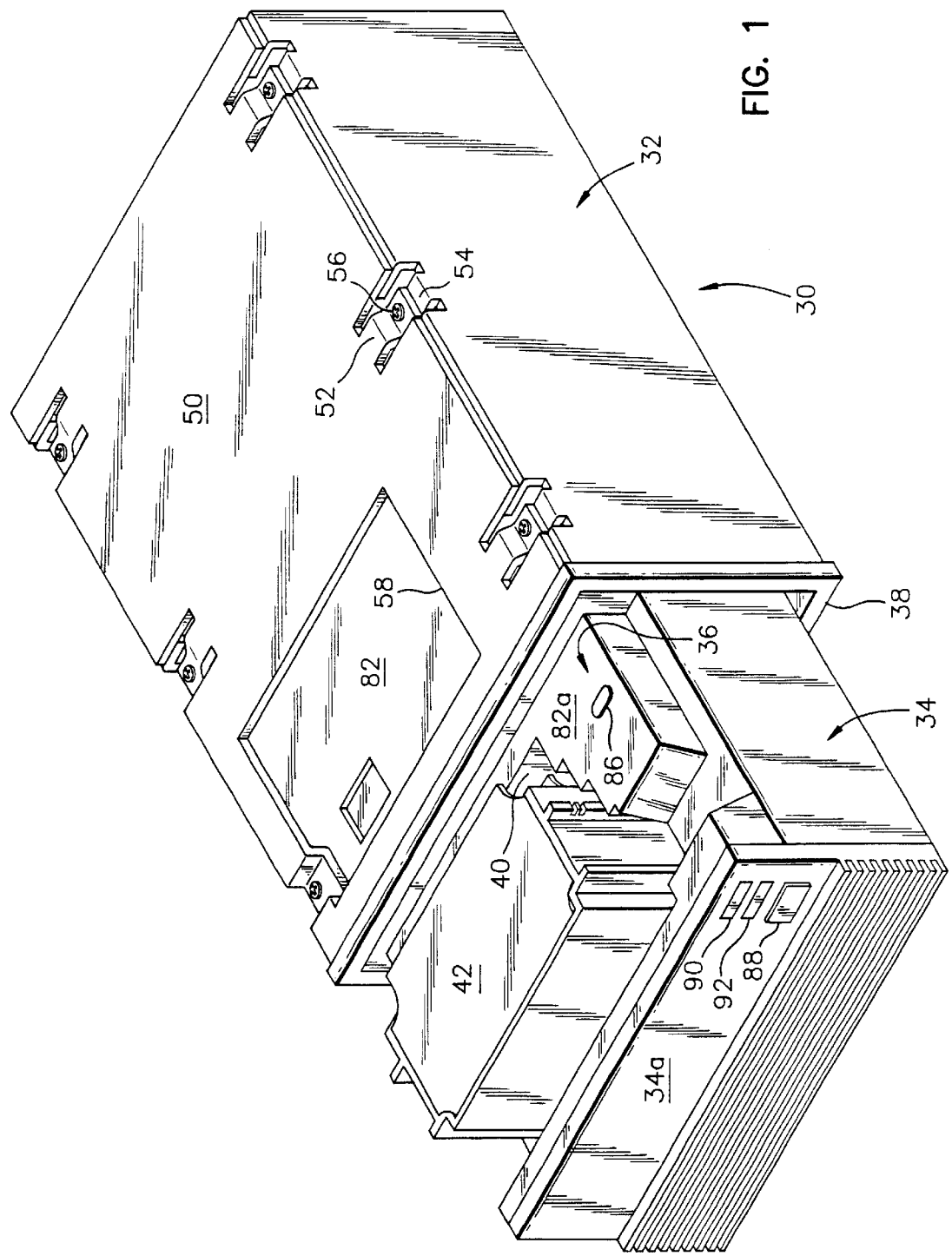

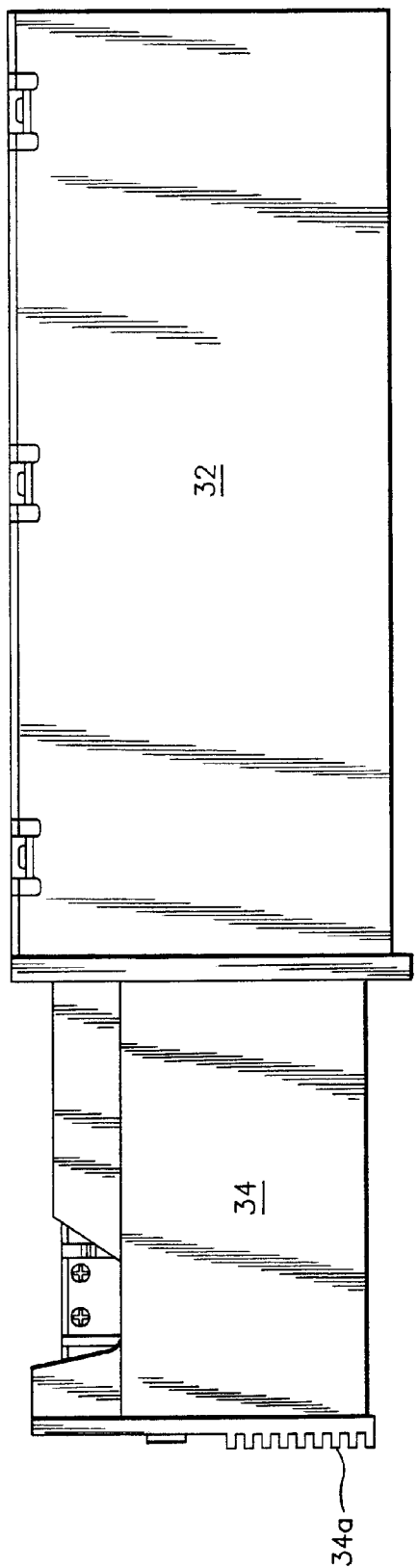
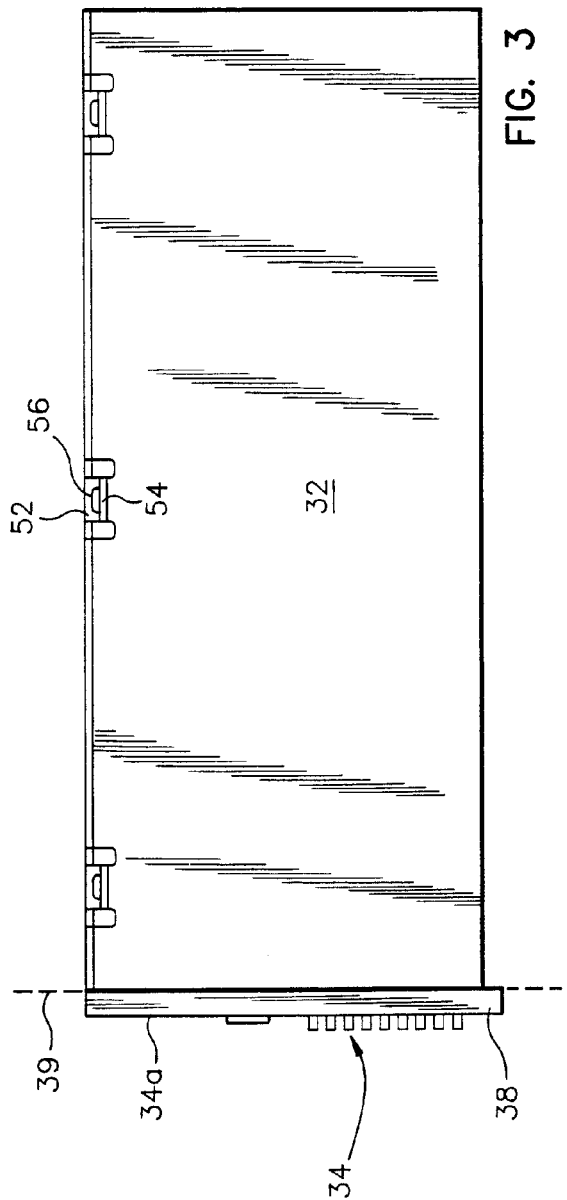

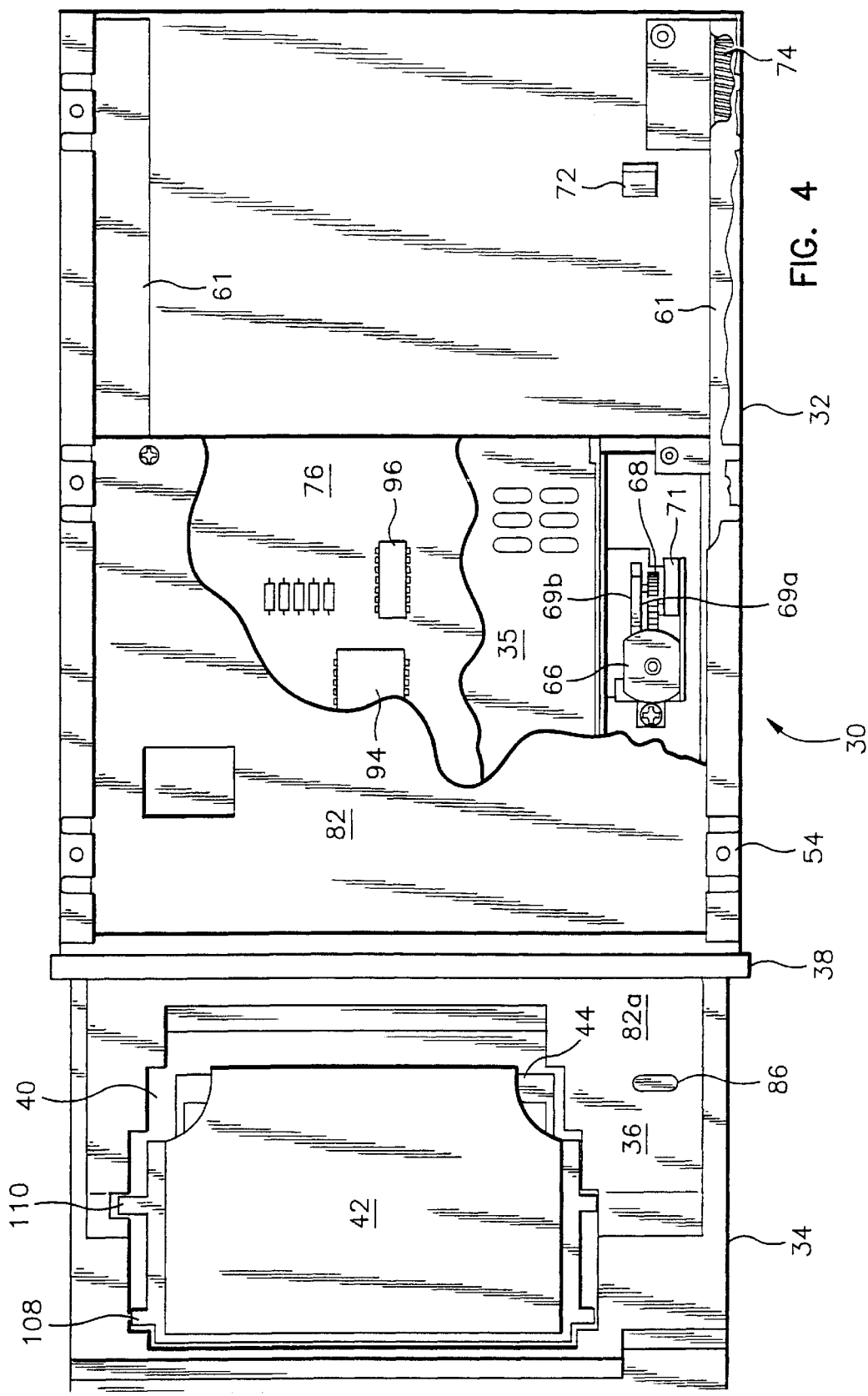

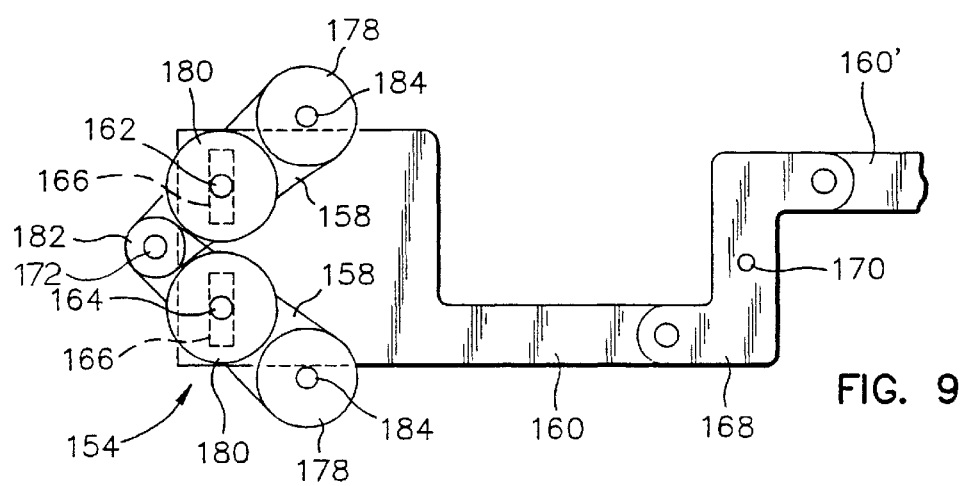
FIG. 9
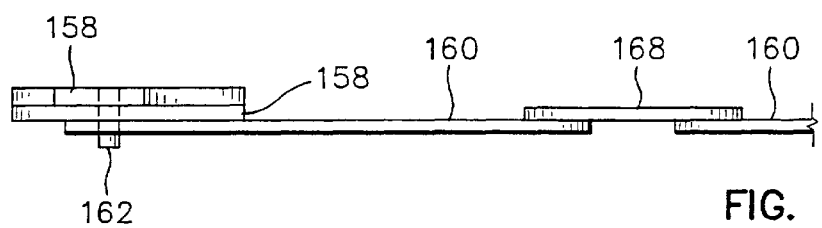
FIG. 10
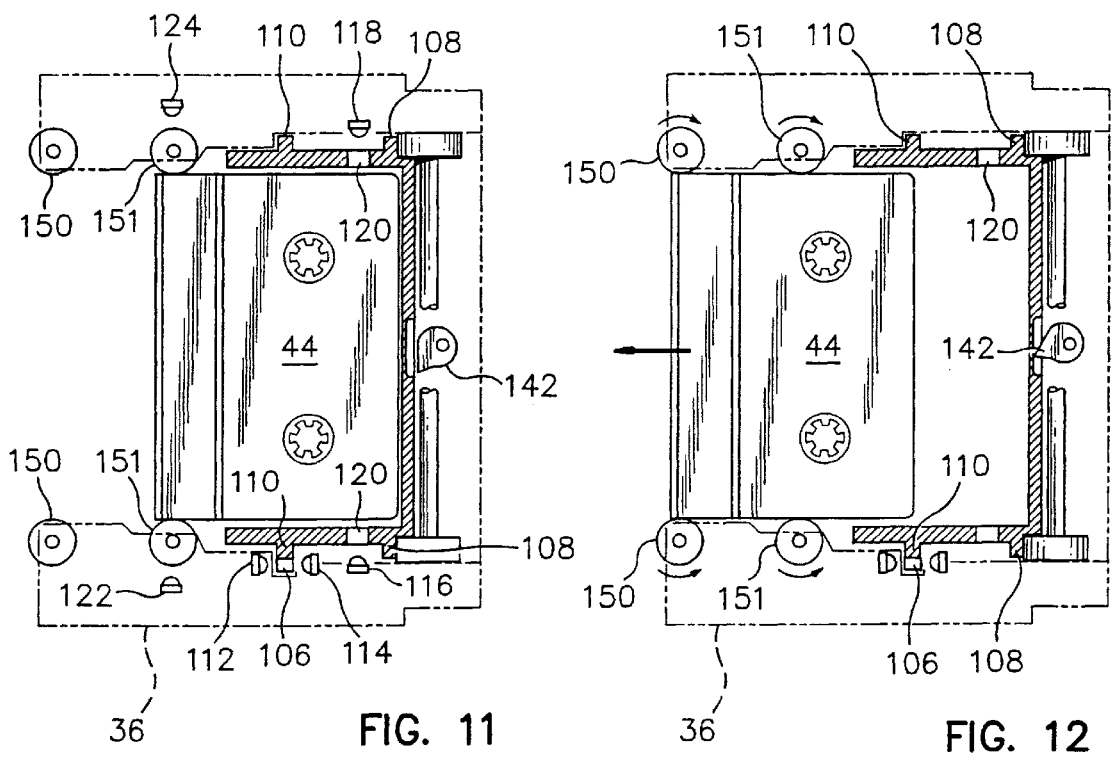
FIG. 11
FIG. 12

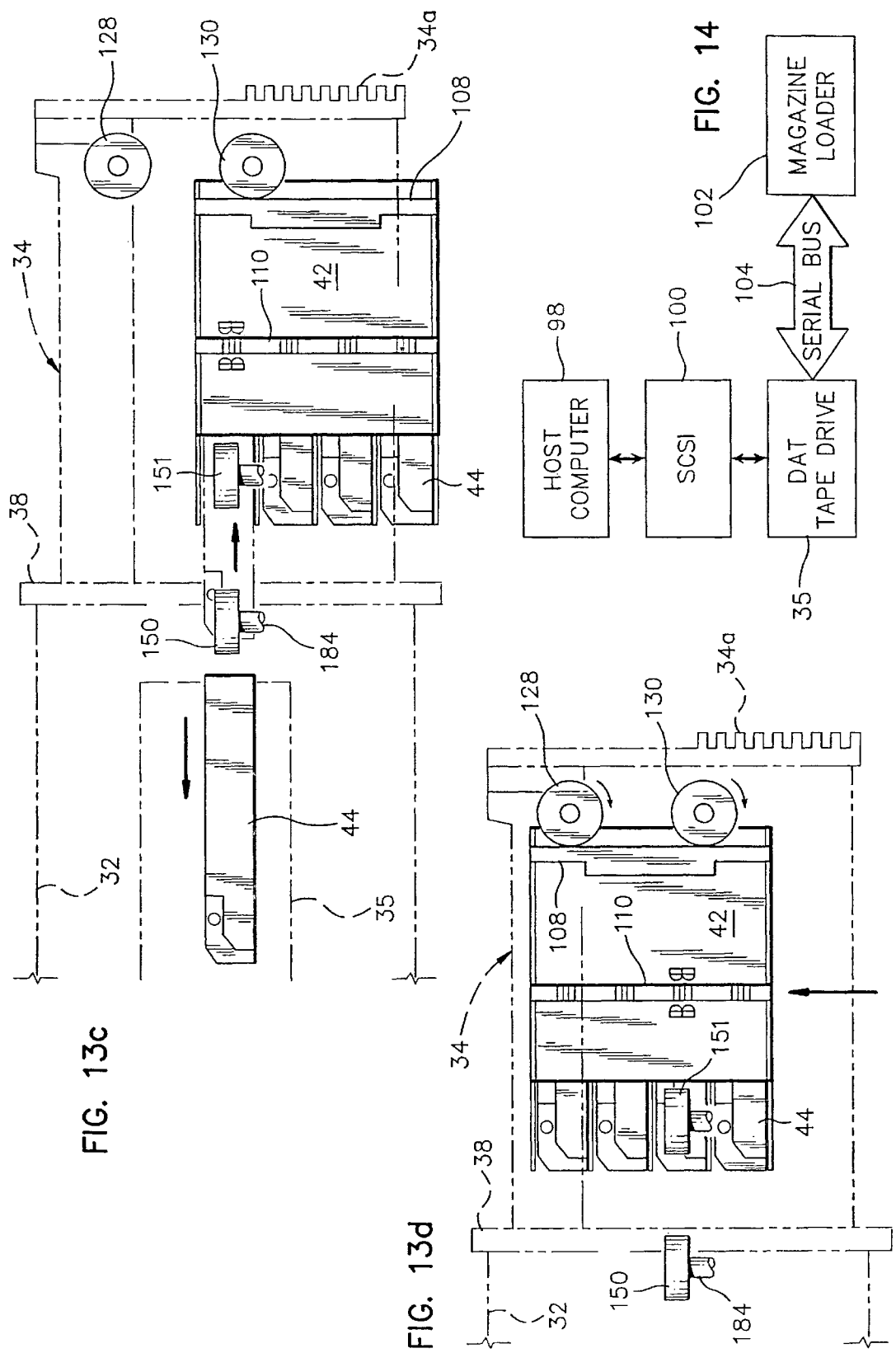

FIVE AND ONE-QUARTER INCH FORM FACTOR COMBINATION DAT TAPE DRIVE AND CASSETTE MAGAZINE LOADER

CROSS-REFERENCE TO RELATED APPLICATION

This application is a continuation of Ser. No. 08/381,744, filed Feb. 1, 1995, now abandoned, which is a continuation of Ser. No. 07/873,443, filed Apr. 24, 1992, now U.S. Pat. No. 5,402,285, which is a continuation in-part of Ser. No. 07/769,036, filed Sep. 30, 1991, now U.S. Pat. No. 5,264,974.

BACKGROUND OF THE INVENTION

The present invention relates to peripheral memory storage devices for computer systems, and more particularly, to tape drive systems in which a plurality of cassettes normally stored within a magazine may be selectively loaded into a tape drive.

With the advent of personal computer systems in the early 1980's, a defacto industry standard was established which requires that hard disk drives, floppy disk drives and tape drives fit within a rectangular space measuring approximately three and one-quarter inches (8.3 centimeters) in height by five and three-quarter inches (14.6 centimeters) in width by eight inches (20.3 centimeters) in length. This standard is hereafter referred to as the "full height five and one-quarter inch form factor". An example of a tape drive which fits within this form factor and utilizes the DC600 tape cartridge is disclosed in U.S. Pat. No. 4,573,091 of Barton, et al. owned by Archive Corporation of Costa Mesa, Calif. U.S.A.

Recently digital audio tape (DAT) technology has been utilized in very high storage capacity tape drives for computer systems in accordance with the so-called SONY/HEWLETT-PACKARD standard. See ANSI X3B5/88-185A. One example is the PYTHON (Trademark) tape drive commercially available from the ARDAT subsidiary of Archive Corporation. The PYTHON tape drive accepts the standard four millimeter DAT cassette and is capable of storing five gigabytes of data thereon. The PYTHON tape drive fits within a smaller industry standard three and one-half inch form factor.

There are a number of applications where it would be desirable to have a relatively low cost peripheral memory storage device which could provide well in excess of five gigabytes of data storage capacity. For example, it would be desirable to be able to download data from the disk server of a large local area network. It would also be desirable to provide backup storage for the data stored on the disk in the event of a head crash.

In co-pending U.S. patent application Ser. No. 07/769,036 identified above, there is illustrated a cassette loading system for selectively loading five four millimeters DAT cassettes from a magazine into a three and one-half inch form factor DAT tape drive such as the PYTHON tape drive. The tape drive is mounted within a receptacle in a personal computer. However, the magazine loader extends beyond the front panel of the personal computer. In the computer industry, it is preferable that the entire peripheral memory storage device be enclosed within the personal computer. This in turn makes it highly desirable that the peripheral storage device be capable of fitting entirely within the full height five and one-quarter inch form factor.

Heretofore there has been one known attempt to provide both a DAT tape drive and cassette loader adaptable to the full height five and one-quarter inch form factor. See U.S. Pat. No. 5,089,920 granted Feb. 18, 1992 to Bryer, et al. However, in FIG. 1 of the Bryer et al. patent, the cassette loader appears to extend outside the form factor beyond the front panel of the PC. According to column 9, lines 11 et seq., the protrusion of the Bryer et al. device beyond the form factor may be eliminated. However, a cassette tray with two levels of three cassettes each is utilized. This in turn requires a complex cassette circulation mechanism.

SUMMARY OF THE INVENTION

It is therefore the primary object of the present invention to provide a combination DAT tape drive and cassette magazine loader which will fit within the full height five and one-quarter inch form factor.

Another object of the present invention is to provide a peripheral memory storage device for a computer that will fit within the full height five and one-quarter inch form factor and permit unattended recording of data on a plurality of DAT cassettes loaded in a magazine.

Another object of the present invention is to provide a peripheral memory storage device of the aforementioned type which can automatically sense a plurality of failure modes and respond with a plurality of predetermined corrective actions.

According to the illustrated embodiment of the present invention, a generally rectangular outer housing is sized to fit within the full height five and one-quarter inch form factor. A drawer is mounted for sliding motion within the housing along a longitudinal axis thereof from a retracted position in which the drawer is substantially fully contained within the housing to an extended position in which a forward portion of the drawer extends beyond a forward transverse end of the housing. A DAT tape drive is mounted within a rear portion of the drawer and has a forwardly opening cassette insertion slot. A cassette magazine is provided that has a plurality of vertically spaced receptacles for holding a plurality of DAT cassettes in a vertically stacked configuration. A magazine loader is mounted in the forward portion of the drawer for receiving and vertically reciprocating the cassette magazine and for selectively transferring cassettes between the magazine and the cassette insertion slot of the DAT tape drive.

BRIEF DESCRIPTION OF THE DRAWINGS

FIG. 1 is a perspective view of a preferred embodiment of a five and one-quarter inch form factor combination DAT tape drive and cassette magazine loader with its drawer in its fully extended position and with a cassette magazine loaded therein in its fully raised position.

FIG. 2 is a side elevation view of the DAT tape drive and cassette magazine loader of FIG. 1 showing the cassette magazine in a lowered position within the drawer.

FIG. 3 is a side elevation view of the combination DAT tape drive and cassette magazine loader of FIG. 1 with its drawer in its fully retracted position.

FIG. 4 is a top plan view of the combination DAT tape drive and cassette magazine loader of FIG. 1 with its drawer in its fully extended position and with a cassette magazine loaded therein. The top panel of the outer housing has been removed and portions have been broken away to reveal certain details of the device.

FIG. 9 is an enlarged plan view of one of the cassette drive wheel engagement assemblies illustrated in FIG. 8.

FIG. 10 is a side view of the assembly of FIG. 9 taken from the top of FIG. 9.

FIG. 11 is a horizontal sectional view through the cassette magazine illustrating a cassette loaded therein. The cassette magazine is shown loaded within the magazine loader which is illustrated in phantom lines.

FIG. 12 is a view similar to FIG. 11 illustrating the manner in which the magazine loader longitudinally transfers the tape cassette into the tape drive.

FIGS. 13a–13d are a series of side elevation views of the cassette magazine and the manner in which it is reciprocated up and down by the magazine loader which is illustrated in phantom lines. FIG. 13c illustrates the manner in which the magazine loader transfers a cassette between the magazine and the tape drive.

FIG. 14 is a block diagram illustrating the connection of the magazine loader control circuit to a host computer through an SCSI interface and the DAT tape drive.

DESCRIPTION OF THE PREFERRED EMBODIMENT

Figure 5:
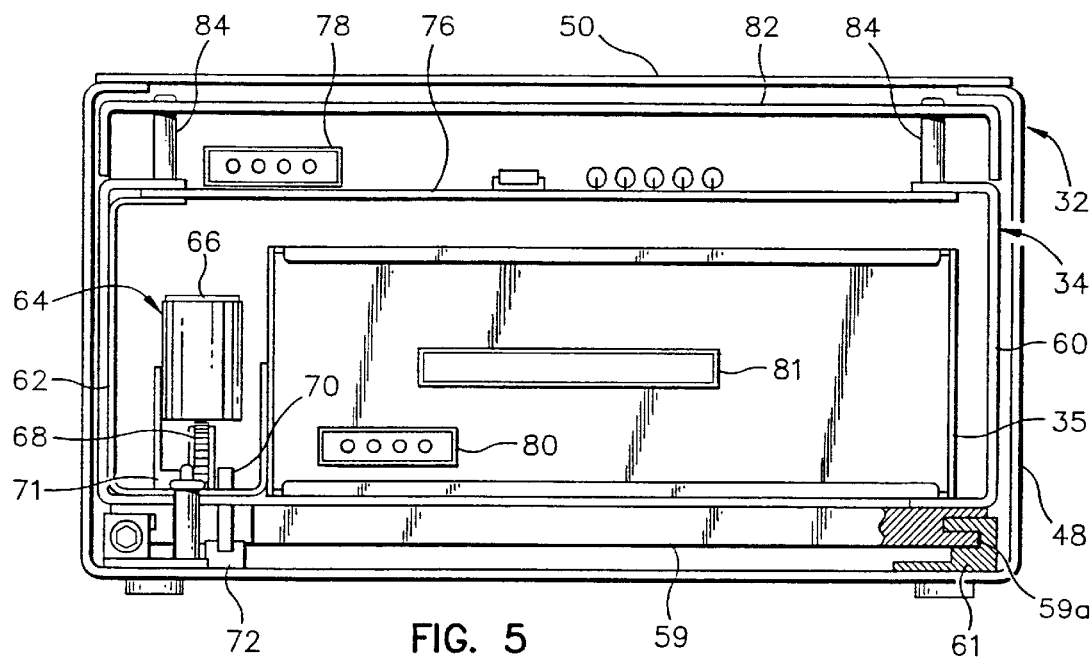
FIG. 5 is an enlarged end elevation view of the combination DAT tape drive and cassette magazine loader taken from the right end of FIG. 2.

The entire disclosure of the aforementioned parent application, namely, U.S. patent application Ser. No. 07/769,036 filed Sep. 30, 1991 and entitled "CASSETTE LOADING SYSTEM" is hereby incorporated by reference.

Referring to FIG. 1, a combination DAT tape drive and cassette magazine loader 30 includes a generally rectangular outer housing 32 and a drawer 34. The drawer slides horizontally from a fully retracted position illustrated in FIG. 3 in which it is substantially contained within the outer housing 32. The drawer slides to a fully extended position illustrated in FIG. 1 in which a forward portion of the drawer extends beyond a forward transverse end of the outer housing 32. A three and one-half inch form factor DAT tape drive 35 (FIG. 4) is mounted in a rear portion of the drawer 34 and a cassette magazine loader generally designed 36 is mounted within the forward portion of the drawer 34.

The outer housing 32 has height, width and length dimensions such that when the drawer 34 is in its fully retracted position as illustrated in FIG. 3, the combination DAT tape drive 35 and cassette magazine loader 36 are both substantially contained within the full height five and one-quarter inch form factor. A front bezel 38 of the housing 32 and a front panel 34a of the drawer may protrude slightly beyond the front panel 39 of the personal computer.

The cassette magazine loader 36 has an aperture 40 (FIG. 4) which extends vertically therethrough for receiving a generally rectangular cassette magazine 42. As explained hereafter in greater detail, the cassette magazine 42 has four slots therein for each receiving a standard four millimeter DAT cassette such as 44 in a horizontal orientation. The DAT cassettes are vertically stacked above each other in the magazine 42. The magazine is vertically reciprocated by the loader 36 to selectively position one of the cassettes for insertion (to the right in FIG. 4) into the DAT tape drive 35. The DAT tape drive 35 is preferably a PYTHON (trademark) tape drive commercially available from Archive Corporation. The cassettes 44 used with the preferred embodiment are standard digital audio tapes (DAT) well-known in the art. Such cassettes are similar to typical VHS video cassettes, in that a dust door 44a (FIG. 6) is provided for protection. The dust door 44a is rotatably mounted on an edge of the cassette facing the tape drive 35. Upon insertion into the tape drive 35, the dust door 44a is raised, exposing the magnetic tape within. The top edge of the dust door 44a has a chamfer 46. This chamfer 46 is used to determine if the cassette 44 is properly oriented within the magazine 42.

The outer housing 32 (FIG. 5) includes a U-shaped piece 48 of sheet metal which forms the side walls and bottom wall of this part of the device. The outer housing 32 further includes a removable sheet metal top panel 50 (FIG. 1). The top panel and the side walls of the outer housing have mating flanges, such as 52 and 54, which are held together with sheet metal screws such as 56. The forward portion of the top panel 50 has a cut-out region 58 (FIG. 1) which is slightly larger than the length and width dimensions of the cassette magazine 42. The top of the cassette magazine can extend just into, and through, the cut-out region 58 when the drawer 34 is in its retracted position and the cassette magazine is cycled to its fully raised position. The purpose of the cut-out region 58 is to provide an additional amount of clearance that will permit four DAT cassettes to be vertically stacked and moved between the cassette insertion slot of the DAT tape drive 35 while still fitting within the full height five and one-quarter inch form factor. The drawer 34 includes a smaller U-shaped piece 60 (FIG. 5) of sheet metal forming the side walls and bottom wall thereof. The DAT tape drive 35 is supported on top of the U-shaped piece 60.

A plastic bottom plate 59 (FIG. 5) is attached to the underside of the U-shaped piece 60. The bottom plate has flanges 59a that extend longitudinally along opposite side edges of the bottom plate. These flanges slide in inwardly opening slots. of rails 61 which extend longitudinally along opposite sides of the bottom wall of U-shaped piece 48. The rails 61 are also preferably made of plastic.

A C-shaped piece 62 (FIG. 5) made of sheet metal is attached to one side of the DAT tape drive 35. It supports a latch mechanism, designated 64, the function of which is to hold the drawer 34 in its retracted position. The latch mechanism includes a DC motor 66 which turns a spur gear 68 through a worm gear (not illustrated). Rotation of the spur gear 68 causes a pair of cams 69a and 69b (FIG. 4) to be rotated. One cam lifts a latch arm 70 clear of a stop 72 affixed to the bottom wall of the U-shaped piece 48 of the outer housing 32. The motor 66, spur gear 68 and latch arm 70 are supported by a L-shaped bracket 71 connected to the C-shaped piece 62. When the latch arm 70 is lifted clear of the stop 72 a pair of springs, such as 74 (FIG. 4), located on opposite sides of the rear end of the outer housing 32 push the drawer 34 forwardly a small amount. An operator thereafter grasps the forward portion of the drawer in order to manually slide it to its extended position illustrated in FIG. 1. The second cam of the latch mechanism 64 actuates a switch (not illustrated) that controls the reset of the latch mechanism.

An electrical signal from a loader control circuit mounted on a printed circuit board 76 (FIG. 5) starts the latch motor 66. This rotates the cams and lifts the latch arm 70 clear of the stop 72. When the latch arm has cleared the stop, the switch cam opens the switch, which turns the latch motor 66 off. When the springs 74 urge the drawer 34 forwardly, another switch (not illustrated), mounted in the rear of the drawer opens, causing the loader control circuit to re-start motor 66. This resets the latch mechanism so that it is prepared for retraction of the drawer. If a foreign object or some other impedient causes the drawer to be blocked so that it cannot move forwardly, after a predetermined amount of time, the loader control circuit will automatically reset the latch mechanism 64.

The printed circuit board 76 (FIG. 5) is connected between the U-shaped piece 60 and the C-shaped piece 62. Electrical connectors 78 and 80 are mounted on the printed circuit board 76, and the DAT tape drive 35, respectively, for interconnecting the loader control circuit and the tape drive. Another larger electrical connector 81 is mounted on the rear of the DAT tape drive 35 for connecting the same to a host computer. A protective top cover 82 is secured to the drawer pieces 60 and 62 via standoff assemblies 84. The protective top cover 82 is preferably made of molded plastic. The forward portion 82a (FIG. 4) of the protective top cover 82 encloses the mechanical components of the magazine loader 36 and defines the aperture 40 which extends through the magazine loader.

Referring again to FIG. 1, the preferred embodiment includes only two manually actuated operator controls. A magazine eject button 86 is mounted on the forward portion 82a of the protective top cover. This button can only be depressed when the drawer 34 is in its extended position, illustrated in FIG. 1, and is otherwise concealed within the outer housing 32 and unavailable for manual actuation. An access button 88 is mounted on the front panel 34a of the drawer 34. A green LED 90 is mounted on the front panel 34a and is illuminated to indicate to the operator that the unit is on-line with the host computer. A yellow LED 92 is also mounted on the front panel 34a and is illuminated to indicate to the operator that the cassette magazine loader 36 is busy loading or unloading a cassette from the DAT tape drive 35.

As previously indicated, a loader control circuit is mounted on the printed circuit board 76 (FIG. 4). This loader control circuit includes a microprocessor 94 and at least one memory chip 96 for storing an operation program. The microprocessor executes this operation program and through standard drive circuits energizes the latch motor 66 as well as the motors and solenoids in the cassette magazine loader 36 which are hereafter described.

An operator may depress the access button 88 to thereby open the drawer 34 in order to load a single cassette directly into the insertion slot of the DAT tape drive 35. Alternatively the operator may load a full, or partially full, cassette magazine 42 into the aperture 40 of the cassette magazine loader 36. When the cassette magazine 42 is installed in the cassette magazine loader 36, the loader automatically lowers the magazine in order to position the number two cassette slot of the magazine 42 adjacent the cassette insertion slot of the DAT tape drive 35. At this time, the operator can manually slide the drawer 34 rearwardly to its fully retracted position illustrated in FIG. 3. The loader control circuit senses that the drawer is in its fully retracted position and proceeds to raise the magazine to place the number one cassette slot of the magazine 42 adjacent the cassette insertion slot of the DAT tape drive 35. When the tape has been completely recorded, the host computer sends an unload command to the drive.

As illustrated in FIG. 14, the DAT tape drive 35 is connected to a host computer 98 through a standard small computer system interface (SCSI) 100. A magazine loader control circuit 102 is connected to the DAT tape drive 35 through an asynchronous serial bus 104.

When the first cassette has been completely recorded, the host computer 98 sends an unload command to the DAT tape drive 35. The DAT tape drive 35 then unloads the first cassette and the loader control circuit 102 causes the cassette magazine loader 36 to return the cassette to its corresponding slot in the cassette magazine 42. The cassette magazine loader 36 then lowers the cassette magazine and transfers the second cassette into the DAT tape drive. The system continues in this fashion until all of the cassettes 44 have been recorded and then returned to the cassette magazine 42.

When the operator pushes the access button 88, the magazine loader circuit moves the magazine 42 to place its second slot adjacent the cassette insertion slot of the tape drive 35. The loader control circuit 102 then opens the drawer 34. This is accomplished by sending an electrical signal to the latch mechanism 64. The drawer 34 moves forwardly a small amount, i.e. one or two inches out of the outer housing 32 under the force of the springs 74. The operator can then grasp the front portion of the drawer 34 and pull the drawer out to its fully extended position illustrated in FIGS. 1, 2 and 4. Subsequent actuation of the magazine eject button 86 causes the loader control circuit 102 to send the appropriate drive signals to the magazine loader 36 causing the cassette magazine 42 to reciprocate to its fully raised position illustrated in FIG. 1. This is also referred to as the docking location of the cassette magazine. If the magazine eject button 86 is again depressed, the magazine will be ejected from the aperture 40. It will be understood that the operation program of the cassette magazine loader 36 may be set up to sequentially load each of the cassettes in order. Alternatively, a selected cassette 44 in the magazine 42 can be loaded under command from the host computer 98. Where the system is set up for automatic sequential loading, and the magazine is partially filled, the system will insert each cassette in turn until all cassettes have been written or read.

Any front loading DAT tape drive of suitable dimensions may be adapted for use in the present invention. A cassette present sensor (not illustrated) in the drive 35 is typically disposed just inside the cassette insertion slot to detect the presence of a cassette 44 at this location and relay the information to the electronic control circuit of the tape drive.

In the preferred embodiment, the cassette magazine loader 36 obtains its power from the host computer system power supply. The power supplied is either 5 VDC at 0.5 amps maximum current, or 12 VDC at 0.25 amps standby and 1.0 amps with the motor running. The interface to the system power may be obtained through a standard keyed four-pin molex type connecter 78 which may, advantageously, be routed internally through the tape drive 35 via connector 80.

Figure 6:
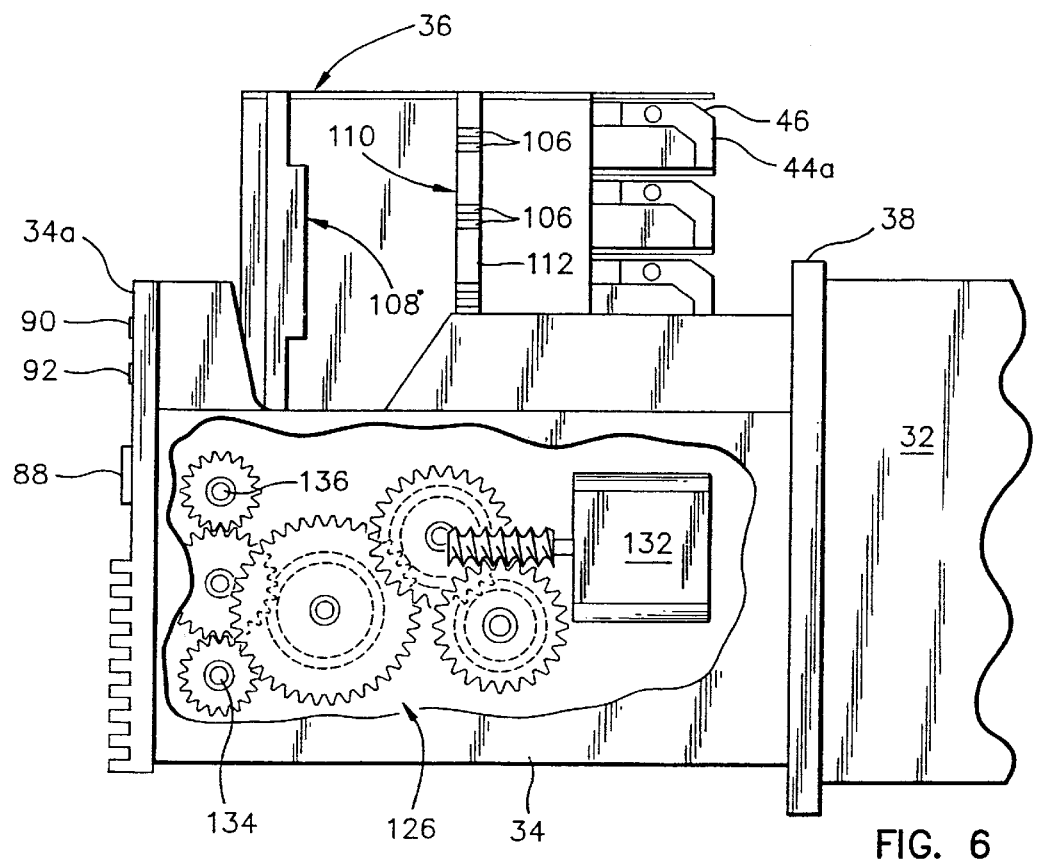
FIG. 6 is an enlarged, fragmentary side elevation view of the forward portion of the combination DAT tape drive and cassette magazine loader of FIG. 1 illustrating its drawer in the fully extended position with a cassette magazine loaded therein. A portion of the drawer has been broken away to reveal details of the drive mechanism that vertically reciprocates the cassette magazine.

As best seen in FIGS. 1 and 6, the cassette magazine 42 may be constructed of rigid molded plastic, or of any other suitable material. The magazine 42 defines a plurality of slots each of which is capable of holding one cassette 44. Preferably, the magazine 42 contains four cassettes 44. This is the maximum number of cassettes that can be reciprocated vertically to the cassette insertion slot of the tape drive 35 within the upper and lower boundaries of the full height five and one-quarter inch form factor. The slots in the magazine are only slightly wider than the width of the cassettes 44, so as to minimize the size of the magazine 42 and to prevent excess motion of the cassettes 44 therein. The magazine 42 is inserted into the loader 36 so that its slots open towards the tape drive 35. The loader 36 reciprocates the magazine 42 vertically to align cassettes 44, disposed within the slots, with the cassette insertion slot of the tape drive 35. The front, or side facing away from the tape drive 35, of the magazine 42 contains an array of locking holes (not visible), corresponding to each slot, into which a locking means is inserted, as described in more detail below. Cassette present through-holes 120, shown in FIGS. 11 and 12, corresponding to each slot in the magazine 42, define unobstructed paths across the transverse dimension of the magazine 42 for which purpose will become apparent further on.

When a cassette 44 is inserted into a slot in the magazine 42, a cassette retainer clip (not visible) in the slot holds the cassette securely within the magazine 42. The retainer clips can comprise tabs located anywhere along the front of the slot. Advantageously, the cassettes 44 are frictionally held in the magazine 42. The orientation of the slots of the magazine 42 toward the tape drive 35 prevents the removal of the cassettes 44 until the magazine 42 is ejected from the loader 36.

Figure 13A:
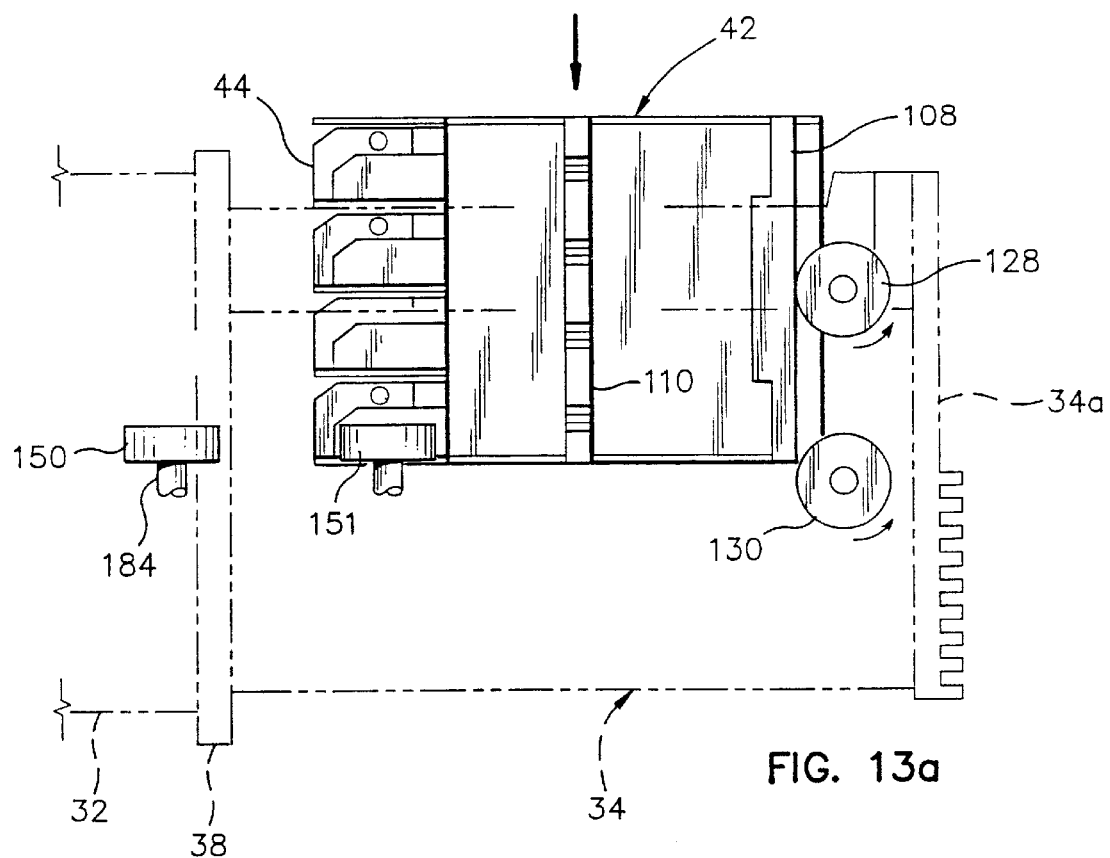
Figure 13B:
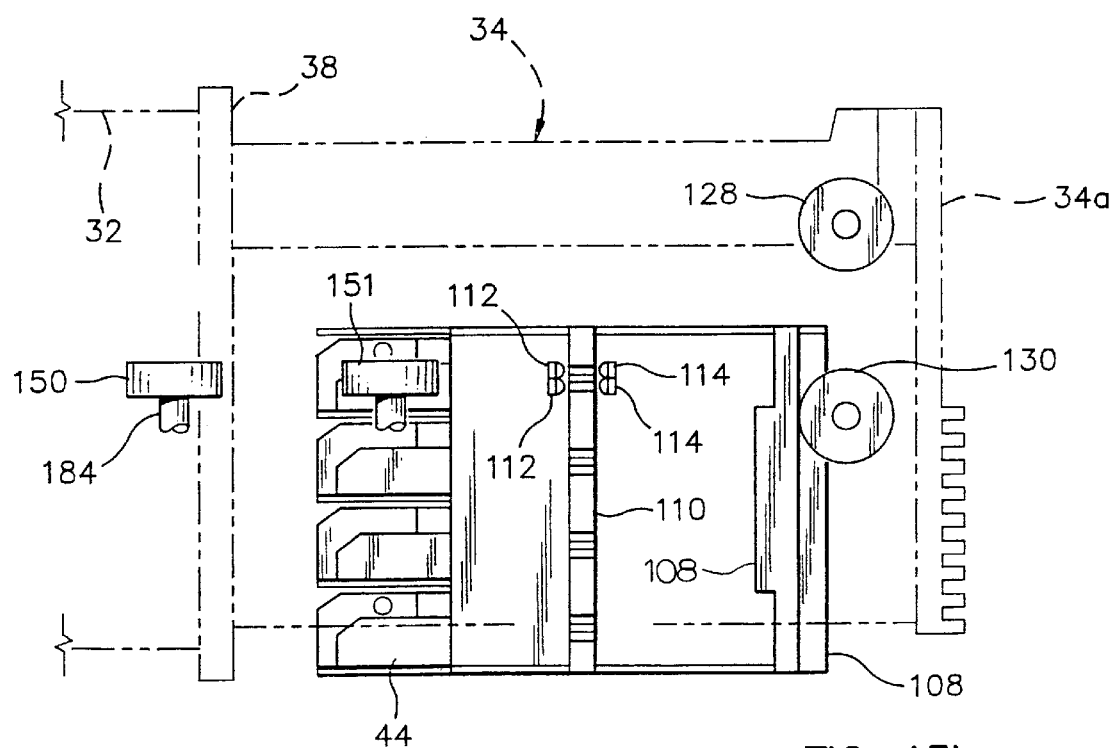
Figure 15:
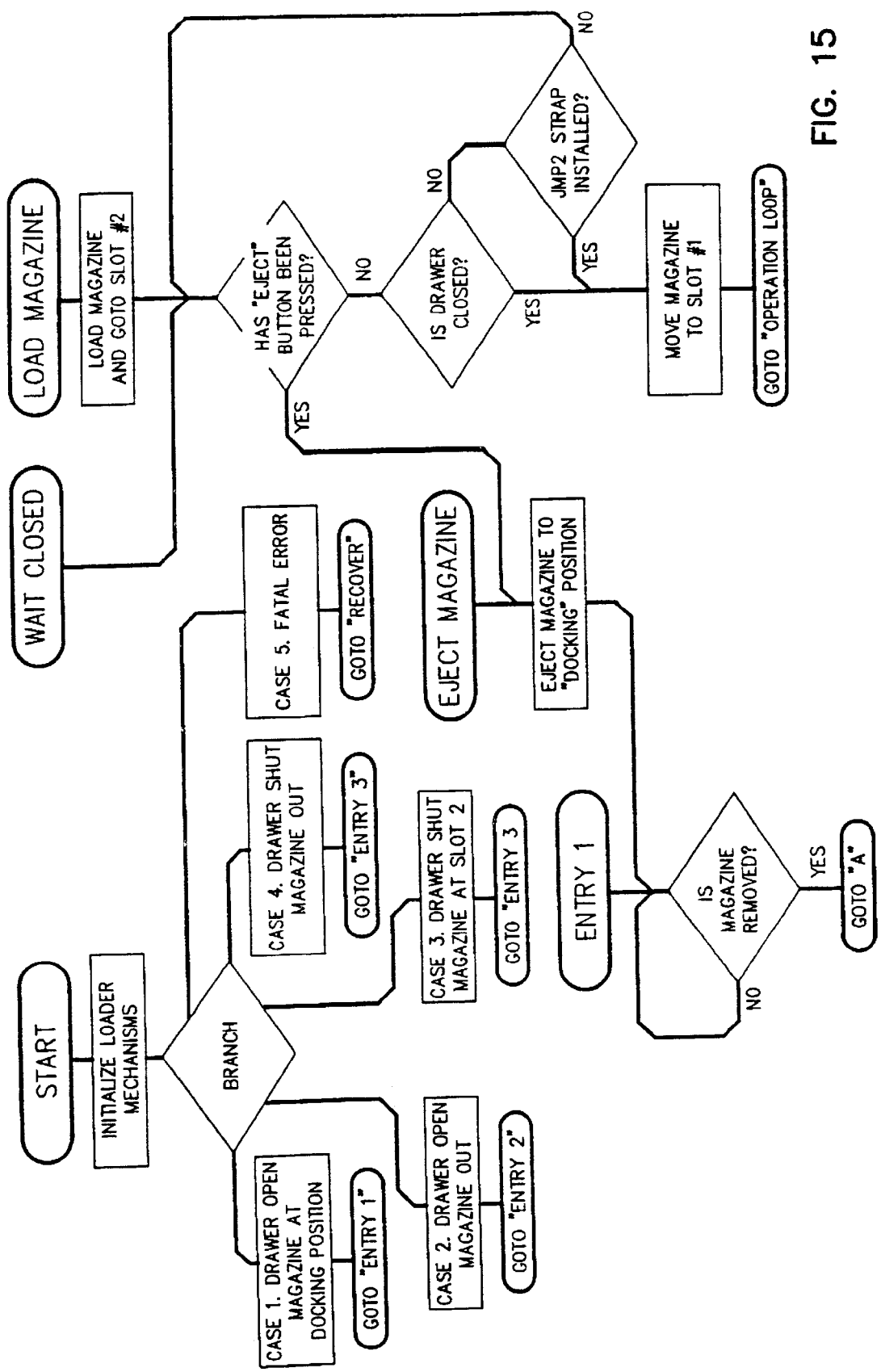
FIGS. 15–18 collectively comprise a flow diagram illustrating the control program executed by the loader control circuit in order to sense a plurality of failure modes and respond with a plurality of predetermined corrective actions.
Figure 16:
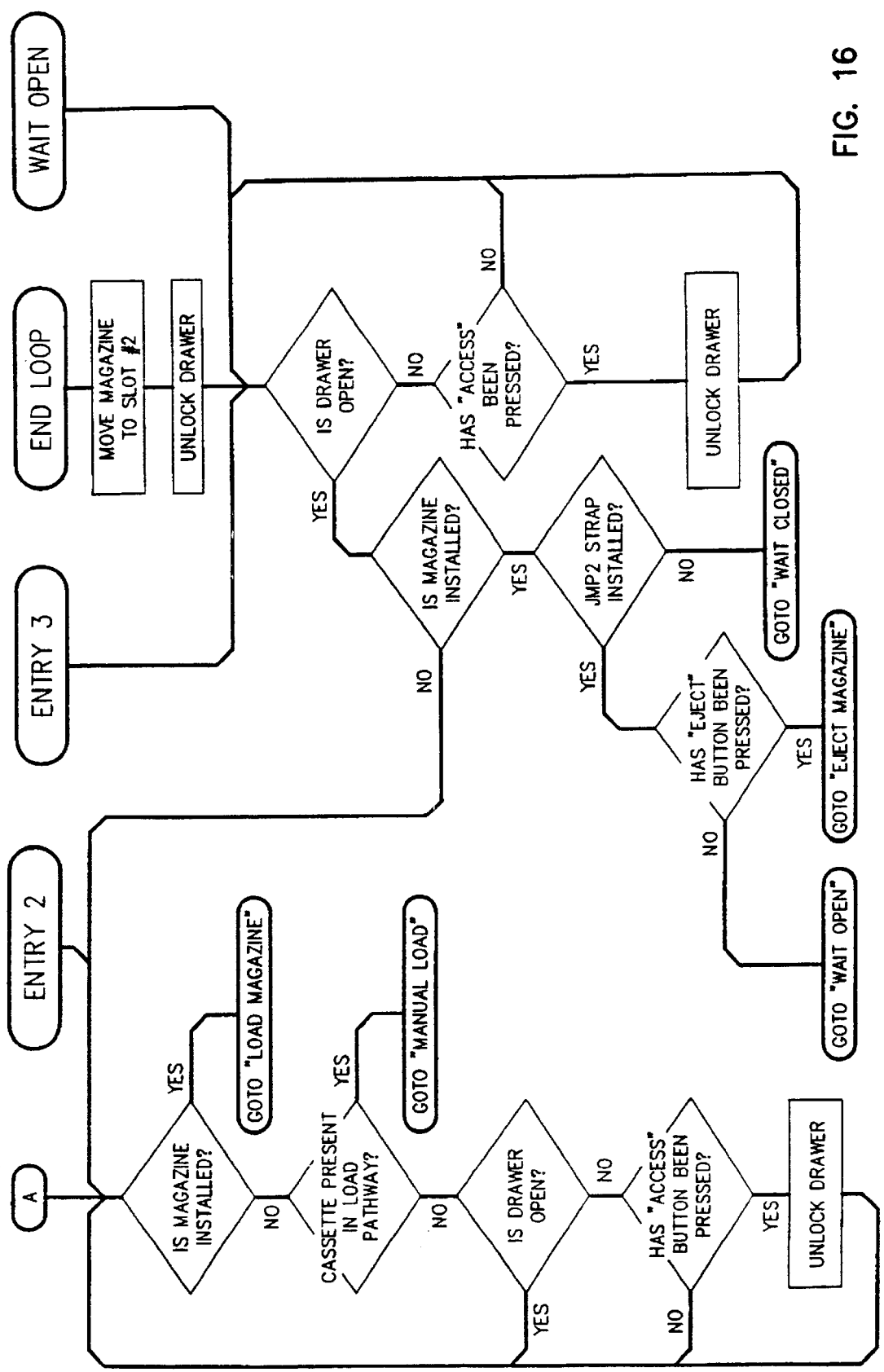
Figure 17:
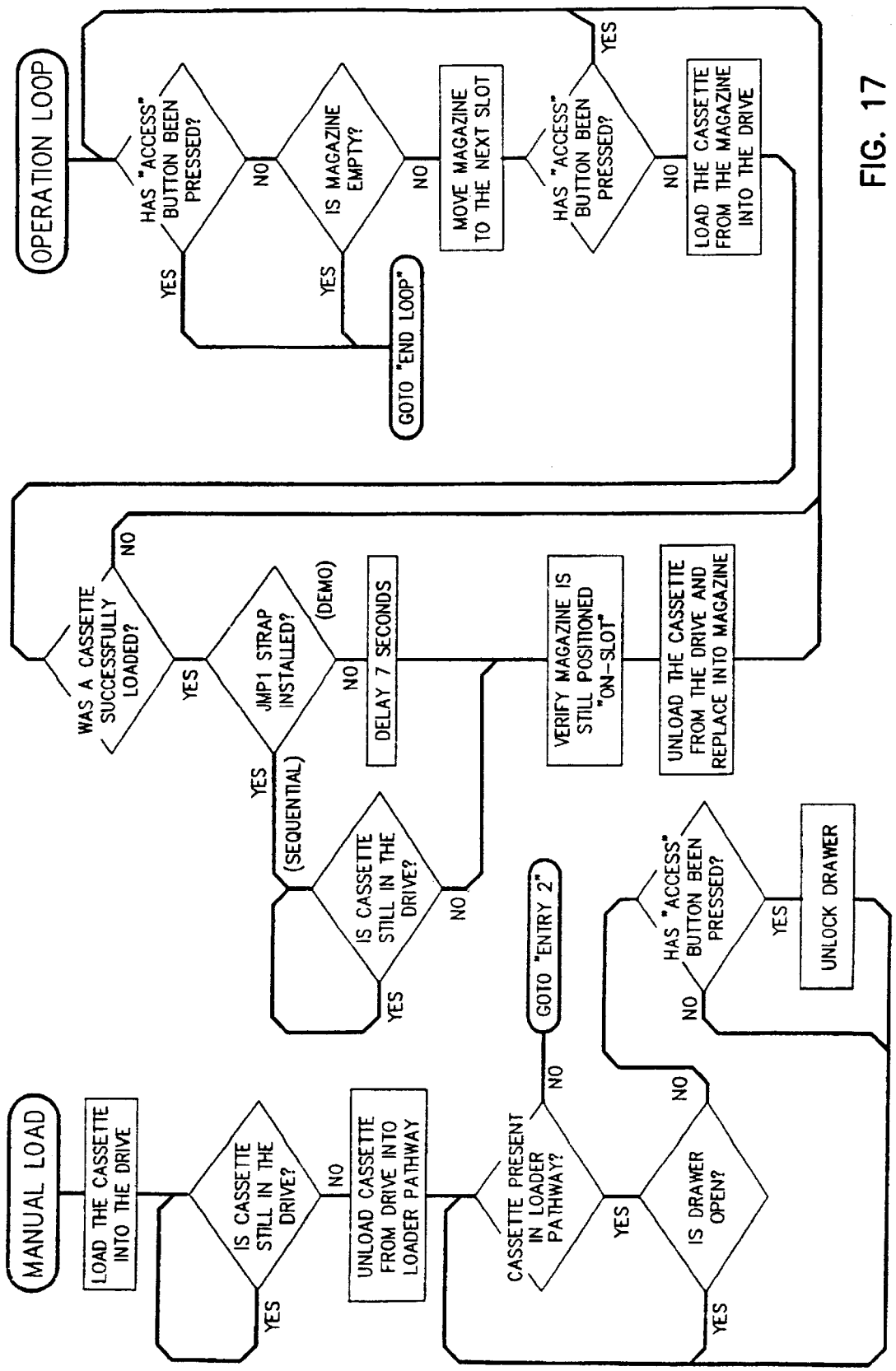
Figure 18:
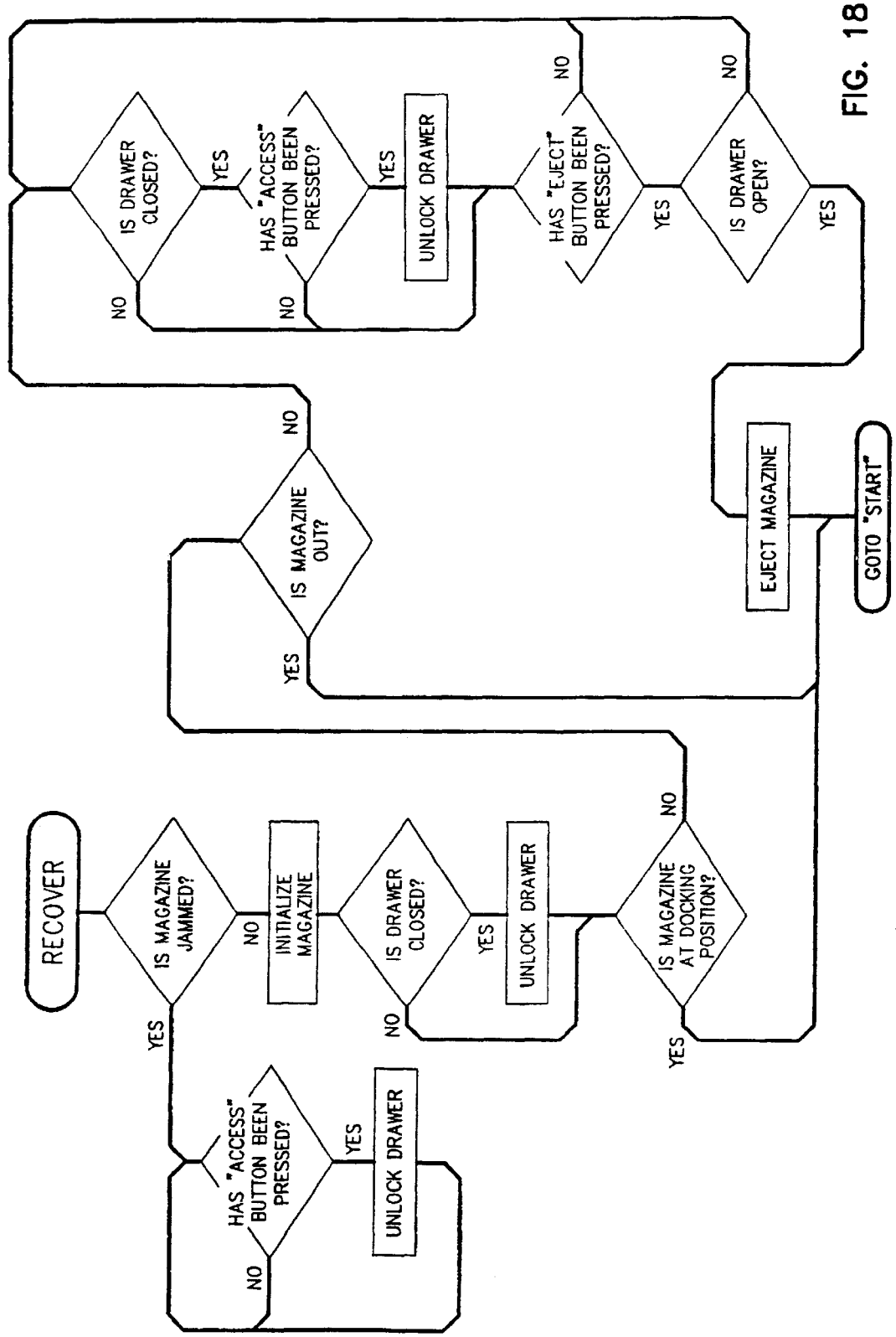

Referring to FIG. 6, vertical flanges 108 and 110 are disposed along either side of the magazine 42 and may be formed of the same plastic material as the magazine 42. The flanges 108 are solid while the other flanges 110 have pairs of registration holes 106 formed therein corresponding to each cassette slot. Each pair of vertically spaced registration holes 106 serves as a flag for a magazine location sensing mechanism. This mechanism includes upper and lower emitter/detector pairs 112 and 114. Only one emitter 112 and its corresponding detector 114 are illustrated in FIGS. 11 and 12. Both pairs are visible in FIG. 13b. The upper and lower emitter/detector pairs associated with the flange 110 work in conjunction with each other. When both pairs are activated, the magazine 42 will be at a position within a relatively narrow tolerance in which a cassette positioned therein can be inserted into the drive or a cassette from the drive can be retracted back into the corresponding slot in the magazine 42. The magazine location sensor mechanism is connected to the loader control circuit 102. The emitters may be infrared LEDs and the detectors may be phototransistors. The use of two emitter/detector pairs to sense the position of the magazine is important to proper operation within the profile of the full height five and one-quarter inch form factor. This magazine location sensor mechanism permits accurate positioning of the magazine without overshoot motion, which would result in the magazine traveling outside the form factor.

Another emitter 116 and detector 118 (FIG. 11) are mounted in opposite sides of the loader 36 for determining the presence of cassettes 44 within the slots of the magazine 42. These devices are connected to the loader control circuit 102. When no cassette 42 is present in a given slot, the cassette present through-holes 120 corresponding to each slot in the magazine 42 allow light to pass from the emitter 116 to the detector 118. Light passage is blocked, and a signal sent to the loader control circuit 102, when a cassette 44 is present in the adjacent slot of the magazine 42.

A third sensor mechanism mounted in the loader 36 determines if each cassette 44 is oriented properly within its slot in the magazine 42. This prevents insertion of an incorrectly oriented cassette into the drive 35. A cassette orientation emitter 122 (FIG. 11) is located on the left side of loader 36 and faces transversely across the aperture 40. A cassette orientation detector 124 is located on the right side of the loader 36 directly across from the emitter 112. The detector 124 senses light from the emitter 122 across the chamfer 46 of the cassette 44. If the cassette is oriented any other way (e.g. upside-down or backwards), light cannot pass from the emitter 122 to the detector 124, and an appropriate signal is sent to the loader control circuit 102.

Figures 7, 8:
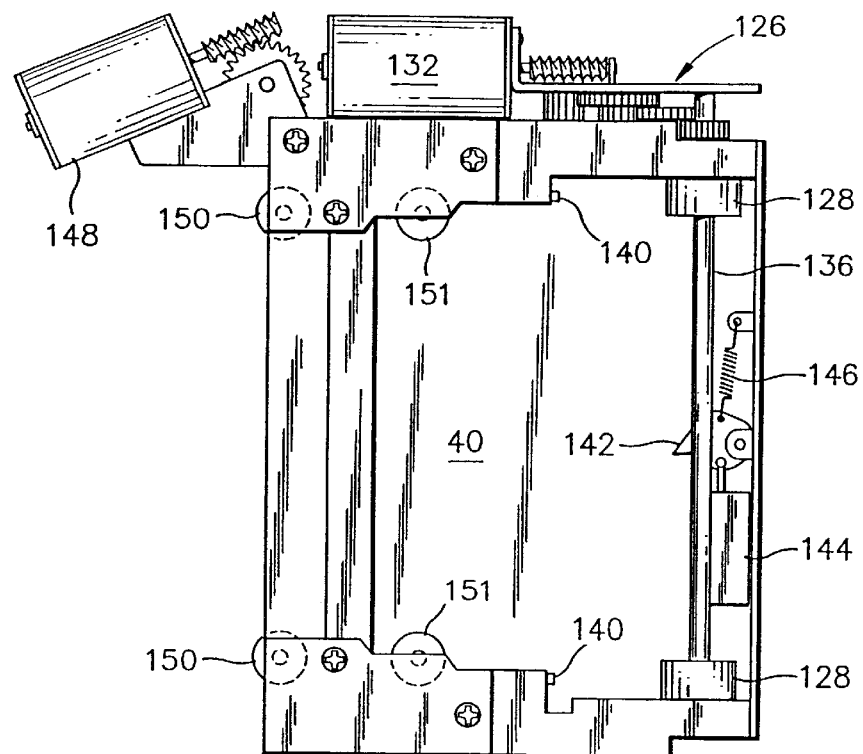
FIG. 7 is an enlarged top plan view of the cassette magazine loader of the FIG. 1 device.
FIG. 8 is an enlarged bottom plan view of the cassette magazine loader of the FIG. 1 device illustrating its relationship to the drawer and the manner in which it transfers a DAT cassette into the DAT tape drive. Visible in this figure are the motor, gear train and cassette drive wheel engagement assemblies that transfer the DAT cassette between the magazine loader and the DAT tape drive.

The magazine 42 is vertically aligned with the cassette insertion slot of the tape drive 35 by means of a linear displacement assembly mounted in the loader 36. The assembly includes a first motorized gear train 126 (FIGS. 6 and 8) culminating in two pairs of drive wheels 128 and 130 (FIG. 8) positioned in the front corners of the loader 36. The first gear train 126 includes, and is driven by, a magazine drive motor 132 mounted on one side of the loader 36, as best seen in FIGS. 6 and 8. In the preferred embodiment, the magazine drive motor 132 can operate at 5000 RPM and powers the first gear train 126 with a relatively high final drive ratio (approximately 100:1 in the preferred embodiment) in order to move the magazine 42 with relatively high speed and accuracy. An additional benefit realized from this high gear ratio is that of accurate stopping due to the absence of drift sometimes associated with motors connected to trains having lesser gear reduction. The high rear ratio also allows the motor 132 to reach its full speed quickly, and to operate with less strain.

When the magazine 42 is properly positioned to present one of its slots to the cassette insertion slot of the tape drive 35 both pairs of detectors 114 will be activated by light from their corresponding emitters 112. As the magazine 42 travels up and down, the sequence of the detector states can be anticipated as described below. Exact magazine positioning is critical in order to avoid cassette jamming problems. This is accomplished with a positioning algorithm executed by the microprocessor 94 of the loader control circuit 102. Two components of the positioning algorithm increase its accuracy. The first component is to always approach a slot from the same direction. This ensures that the magazine will always be positioned relative to a given magazine slot edge, either top or bottom. The algorithm ensures that the loader 36 always approaches a slot while moving the magazine 42 in the upward direction, implying that the magazine is always positioned relative to the top edge of an "on-slot" indication. The second component of the positioning algorithm is to make the final approach into the "on-slot" condition slowly. This avoids trying to dynamically brake the magazine 42 from a high speed under varying friction and load conditions, which can lead to inaccuracies. Instead, a DC motor brake signal is applied prior to an on-slot indication.

Ideally, one would like to be able to run the motor 132 continuously at a slow speed. In order to prevent motor stall problems however, this method of control would require either a robust motor position feedback, or sophisticated motor drive electronics. The approach used in the preferred embodiment to obtain a slow motor speed, involves open-loop "micro-stepping" of the motor. A "micro-step" is defined as 2.5 milliseconds (ms) of motor full-on followed by 25 ms of motor full-off. Thus each micro-step is 27.5 ms long. The magazine position detectors 114 are monitored with each micro-step taken. When the "on-slot" indication is seen, three additional micro-steps are taken and the motor 132 comes to a stop. The reason for taking three additional steps is for margin purposes, i.e., it is undesirable to stop on the very edge of an on-slot indication as any movement of the magazine whatsoever (such as during cassette loading/ unloading) would cause the on-slot indication to be lost. Typically, an on-slot condition is approximately sixteen micro-steps "wide", although this can vary with load and friction.

Verification of successful magazine positioning occurs at two different times. First after the magazine 42 is positioned to a selected slot, a small time delay occurs to allow any mechanical ringing to die out. The on-slot condition is then verified. The other verification occurs just prior to unloading a cassette. For the case where verification fails, three attempts are made to correct the problem. Should the problem not be corrected after three attempts, a firmware re-start occurs. The correction procedure is as follows. If neither of the detectors 114 is active, a severe mis-position has occurred. No correction is attempted under this condition as this may cause the magazine to disengage from its drive rollers. Instead a firmware re-start is executed. Generally, however, at least one of the detectors 114 will be active. Corrective action involves positioning to an adjacent slot, and then returning to the original slot. For slots at the extreme magazine position (slots #1 and #4) the only option is to reposition to the closest interior slot. For interior slots, the magazine can reposition to a slot either above or below the current slot, and in fact, for these interior slots, successive correction attempts alternately reposition to adjacent slots either above or below the current one.

The magazine 42 is inserted through the similarly shaped magazine aperture 40 which extends vertically through the entire loader 36. The aperture 40 and magazine 42 are generally rectangular in cross-section and define a front, a rear and two sides. As described above, the magazine 42 is oriented with the openings of its slots facing rearwardly. The upper and lower pairs of drive wheels 128 and 130 contact the front portion of the magazine 42. The lower drive wheels 130 are rotatably mounted on an axle 134 (FIG. 8) running transversely across, the lower front corners of the aperture 40. The upper drive wheels 128 are rotatably mounted on an axle 136 running transversely across the upper front corners of the aperture 40. Each pair of magazine drive wheels is disposed relative to each other symmetrically about the front-to-rear centerline of the magazine 42. The drive wheels 128 and 130 apply a rearward force on the magazine 42 which is mirrored by reactive forces provided by the bearing surfaces 138 of the loader 36. The bearing surfaces 138 are forward facing vertical ledges. In the preferred embodiment, each bearing surface includes two rollers such as 140 which help provide smooth vertical reciprocation.

Preferably, the drive wheels 128 and 130 are constructed from a natural or synthetic rubber material, such as polyurethane. The material should have sufficient yieldability to press the magazine 42 against the rollers 140 on the bearing surfaces 138. This results in non-slip drive action without excess friction against the rollers 140 on the bearing surfaces 138. Also preferably, the drive wheel material has a Schorr hardness within the range of approximately 65 to 80. The wheels 128 and 130 may have radial slits to enhance traction.

The magazine 42 is vertically adjustable and, positioned to present a selected magazine slot to the cassette insertion slot of the tape drive 35. When a particular magazine slot is aligned with the cassette insertion slot, magazine movement is restricted by a magazine lock tab 142 (FIG. 7) extending into a locking hole (not visible) in the magazine 42. The locking tab 142 is pivotally mounted inside the front end of the loader 36, as best seen in FIGS. 7 and 8. A magazine lock solenoid 144 actuates the locking tab 142 to its extended position when instructed to do so by the loader control circuit. A magazine lock spring 146 biases the locking tab 142 towards its retracted position. The locking tab serves as a security device to prevent removal of the magazine 42 from the loader 36 at an inappropriate time. In a subsequent modification of the cassette magazine loader we have eliminated the locking tab 142. However it may be desirable to include this feature depending upon the user environment.

The loader 36 includes transfer means for moving a cassette 44 into the cassette insertion slot of the tape drive, and also to retract the cassette when ejected by the tape drive. In the preferred embodiment, this transfer means includes a cassette transfer motor 148 (FIGS. 7 and 8), cassette drive wheels 150 and 151, and cassette drive wheel engagement assemblies 152 and 154. The cassette engagement assemblies 152 and 154 have identical components and are mounted on opposite sides of the loader 36.

Referring to FIGS. 8, 9 and 10, the cassette engagement assembly 154 includes an engagement solenoid 156, a solenoid piston 157, a pair of swing arms 158, a link plate 160, and two planetary gear shafts 164. The ends of the shafts 164 are slidingly disposed within slots 166 in the link plate 160. One end of the link plate 160 is connected to the end of a bell crank 168 which is pivotable about a center pin 170. One end of the link plate 160' of the other cassette engagement assembly 152 is connected to other end of the bell crank 168.

The engagement solenoid 156 is mounted at the rear end of the loader 36 so that its piston 157 extends in a transverse direction across the loader 36. The piston 157 is connected to the link plate 160 for moving the same in a transverse direction. The bell crank 168 enables simultaneous equal and opposite transverse motion of the two link plates 160 and 160' via energization of the solenoid 156. Upon outward transverse motion of the link plate 160, both swing arms 158 pivot outward about a connecting shaft 172 due to a moment created by the slots 166 pushing the planetary gear shafts 162 and 164 outward. The planetary gear shafts 162 and 164 are free to slide within the slots 166 to prevent jamming.

Referring back to FIG. 8, the cassette transfer motor 148 is activated by the loader control circuit 102 after a slot in the magazine 42 is vertically aligned with the cassette insertion slot of the tape drive 35. The cassette transfer motor 148 drives a second gear train 174 mounted in a corner of the loader 36. The second gear train 174 drives a timing belt 176 around pulleys 178 and 180. The pulleys 178 and 180 rotate the cassette drive wheels 150 and 151 through planetary assemblies of gears such as 178, 180 and 182 (FIG. 9) mounted at the end of each of the link plates 60 and 160'. The cassette drive wheels 150 and 151 are mounted. on the ends of the same shafts 184 which support the gears 178. The engagement solenoid 156 can be energized and de-energized to move the cassette drive wheels 150 and 151 laterally for engaging and disengaging the end edges of one of the cassettes 44 to propel the same between the magazine 42 and the cassette insertion slot of the tape drive 35.

FIGS. 13a through 13d are a series of enlarged side elevation views illustrating the manner in which the cassette magazine 42 is reciprocated up and down within the loader 36 in the drawer 34. The upper and lower magazine drive wheels 128 and 130 are shown engaging the magazine to vertically reciprocate the same. FIGS. 13a–13d also illustrate the manner in which the cassette drive wheels 150 and 151 can engage and transfer a selected one of the cassettes 44 between the magazine 42 and the insertion slot of the tape drive 35.

Each cassette 44 may be selectively located in alignment with the cassette insertion slot of the tape drive 35 and transferred back and forth from the magazine 42 to the tape drive 35. During vertical reciprocation of the magazine 42 by the loader 36, the cassette drive wheel engagement assemblies 152 and 154 are maintained in their retracted positions, i.e. away from the center line of the loader 36, by the retraction of piston 157 of the engagement solenoid 156. The outer end of the piston 157 is connected to the inner end of the link plate 160. When the piston 157 is in its retracted position, the link plates 160 and 160' are at their outermost range, forcing the swing arms 158 outward as well. In this configuration, the cassette drive wheels 150 and 151 are in their outermost positions and are not in contact with any cassette 44 located in the adjacent magazine slot. When a predetermined slot in the magazine 42 has been aligned with the cartridge insertion slot of the tape drive 35 the engagement solenoid 156 is tripped, and the piston 157 is extended. The link plates 160 and 160' move inward simulataneously due to the action of the bell crank 168. This rotates the swing arms 158 toward the middle of the enclosure 32. The drive wheels 150 and 151 on the ends of the swing arms 158 are now positioned sufficiently inward to engage the sides of the preselected cassette 44. The cassette transfer motor 148 is activated at this time. The motor 148 powers the timing belt 176. This drives the cassette engagement wheels 150 and 151 to propel the cassette 44 longitudinally between the magazine 42 and the tape drive 35. In a later version of the cassette magazine loader 36 we have achieved acceptable performance in substituting a DC motor and drive mechanism for the engagement solenoid 156.

The magazine loader 36 preferably performs one unload and load cycle in 8.5 seconds or less. One cycle is measured from the time a cassette 44 is removed from the drive tape drive 35, re-inserted into the magazine 42, the magazine 42 is indexed and a second cassette 44 is loaded into the tape drive 35. If the drawer is parked in its fully extending position over the edge of a desk it is possible to utilize a magazine that holds more than four cassettes. The same is true if the combined DAT drive and magazine loader is installed in a computer having a tower. configuration or in a rack mounted computer system. The magazine can then reciprocate an extended amount through the cut-out region 58 and a similar cut-out region (not visible) in the bottom cover of the cassette magazine loader 36. In this manner of operation it is possible to use a cassette magazine that holds, for example, five or even twelve cassettes.

FIGS. 15–18 collectively comprise a flow diagram illustrating the control program executed by the motor control circuit 102 in order to sense a plurality of failure modes and respond with a plurality of predetermined corrective actions. The loader control circuit utilizes inputs from the various sensors in the loader 36 described above. FIGS. 15–18 are sufficiently detailed that further explanation is not required for those skilled in the art.

While we have described a preferred embodiment of our full height five and one-quarter inch form factor combination DAT tape drive and cassette magazine loader, it should be understood that modifications and adaptations thereof will occur to persons skilled in the art. For example the magazine 42 and magazine loader 36 could be modified to handle a plurality of DC2000 tape cartridges. In such a case the tape drive 35 could be of the type shown in co-pending U.S. patent application Ser. No. 07/830,171 filed Jan. 31, 1992 naming William R. Miller et al. as co-inventors. Said application is entitled "Reduced Height Mini-cartridge Tape Drive for Three and One-half Inch Form Factor" and is assigned to Archive Corporation. Therefore, the protection afforded our invention should only be limited in accordance with the scope of the following claims. In these claims, "cassette" shall be construed to include "cartridge" as well.

We claim:

1. A memory storage device for a computer, comprising:
   a DAT drive;
   a DAT cassette magazine for receiving and holding a plurality of DAT cassettes within a plurality of magazine slots in a vertically stacked configuration; and
   magazine loader means for receiving and vertically reciprocating the magazine and for horizontally transferring a preselected cassette from the magazine to the DAT drive upon receipt of a command relayed from the computer through the DAT drive;
   wherein the DAT drive and the magazine loader means are mounted completely within an enclosure within the computer.

2. A memory storage device according to claim 1 wherein the magazine loader means includes means for determining if the plurality of DAT cassettes are properly oriented within the magazine loader means.

3. A memory storage device according to claim 1 wherein the DAT cassette magazine has at least one vertically extending flange with a plurality of pairs of vertically spaced registration holes formed therein, each pair of registration holes corresponding to a slot in the magazine that holds a single cassette, and the magazine loader means includes a first emitter and a first detector positioned for sensing the location of a first one of the registration holes of a given pair and a second emitter and a second detector positioned for sensing the location of a second one of the registration holes of the given pair.

4. A memory storage device according to claim 1 wherein said magazine loader means includes means for determining if a DAT cassette of the plurality of DAT cassettes is present within a magazine slot of said plurality of magazine slots.

5. A memory storage device according to claim 1 wherein said magazine loader means includes means for vertically aligning a magazine slot of said plurality of magazine slots with said DAT tape drive.

6. A memory storage device for a computer, comprising:
   a DAT drive;
   a DAT cassette magazine for receiving and holding a plurality of DAT cassettes within a plurality of magazine slots in a vertically stacked configuration, said cassette magazine having a vertically extending flange having vertically spaced registration holes for determining proper alignment of said plurality of magazine slots with said DAT drive; and
   a magazine loader for receiving and vertically reciprocating the cassette magazine and for horizontally transferring a preselected cassette from the cassette magazine to the DAT drive upon receipt of a command relayed from the computer through the DAT drive, said magazine loader including a first non-mechanical sensor operative, in conjunction with said registration holes, to detect improper insertion of a cassette within a magazine slot prior to an attempt to load the cassette into the DAT drive;
   wherein said magazine and magazine loader fit completely within an enclosure within the computer.

7. A memory storage device of claim 6, wherein said first non-mechanical sensor is operable to sense whether a cassette is properly oriented within said plurality of magazine slots.

8. A memory storage device of claim 6, further including a second non-mechanical sensor for sensing alignment of a cassette with an opening of said DAT drive.

9. A memory storage device of claim 6, further including a third non-mechanical sensor for sensing the presence of a cassette within a respective magazine slot.

* * * * *